Oct. 18, 1960 F. A. KRÖGER ET AL 2,956,912

LEAD SULPHIDE SEMI-CONDUCTIVE BODIES AND METHOD OF MAKING SAME

Filed April 26, 1956

INVENTOR

FERDINAND ANNE KRÖGER

JAN BLOEM

BY Fred M. Vogel

AGENT

United States Patent Office 2,956,912

Patented Oct. 18, 1960

2,956,912

LEAD SULPHIDE SEMI-CONDUCTIVE BODIES AND METHOD OF MAKING SAME

Ferdinand Anne Kröger and Jan Bloem, Eindhoven, Netherlands, assignors, by mesne assignments, to North American Philips Company, Inc., New York, N.Y., a corporation of Delaware Filed Apr. 26, 1956, Ser. No. 580,912

Claims priority, application Netherlands May 4, 1955

7 Claims. (Cl. 148—1.5)

Figure 1:

The invention relates to the production of semi-conductive devices, more particularly photo-sensitive devices, by the precipitation of lead sulphide layers on a support.

It is well known that continuous lead sulphide layers having good adherence can be precipitated from a lead acetate solution in the presence of thio-urea and alkali-hydroxide. Usually layers of p-type conductivity are produced by this method. It is thought possible that the absorption of alkali in the lead sulphide is significant in this process.

It is also possible for the alkali hydroxide to be replaced partly or even entirely by hydrazine so that layers are produced of a lesser p-type conductivity or even of n-type conductivity.

The lead sulphide layers produced by the said methods on usual support macterials, such as, for example, glass, always assume p-type conductivity when exposed to air. By heating the layers produced in air to temperatures between 70° C. and 120° C. for a period of, for example, 20 hours, the resistance of the layers becomes more stable and increases and consequently their photo-conductivity is improved.

In arriving at the invention, it was found experimentally that, when lead sulphide is precipitated on a support which has been previously provided with a layer consisting of one or more electropositive elements, said elements may influence the properties of the lead sulphide.

According to the invention, when producing semi-conductive devices, more particularly photo-sensitive devices, by the precipitation of lead sulphide on a support from a solution of lead acetate in the presence of thio-urea and alkali hydroxide and/or hydrazine, the said support is at least in part previously provided with a layer consisting of one or more electro-positive elements, which during the precipitation of the lead sulphide are dissolved at so low a rate of speed that the process of dissolving is effected at least in part during the deposition of the lead sulphide layer. When the thickness of the said layer is so chosen that it does not completely dissolve during the precipitation of the lead sulphide, the remaining part may be used as a contact.

By dissolving the elements previously provided on the support, a reducing environment is produced at this point, so that lead sulphide containing a proportion of lead exceeding the exact stoichiometric composition is deposited, which has a certain content of the said elements. Consequently, the conductivity properties are shifted in the direction of n-type conductivity.

When the lead sulphide layers thus produced are stored or heated in air, it was found that the elements from the dissolved layer which have been partly absorbed in the lead sulphide lattice have different effects according to their valency.

The layers produced with the use of monovalent elements, such as, for example, Cu, Ag, Au, after being heated in an oxidizing atmosphere to temperatures between 70° C. and 120° C., assume p-type conductivity and are stabilized against reduction. The use of bivalent elements, such as, for example, Pb, Zn, Cd, Fe, Ni, Co, under the same conditions also results in the production of layers of p-type conductivity.

However, when the intermediate layer is produced from elements having a valency 3 or more, such as for example, Al, Ga, In, As, Sb, Bi, Ti, V, Mo, W, and when the lead sulphide is precipitated from a reaction mixture containing no alkali, the conductivity of the layers remains of the n-type after storing and heating in air. The same holds for lead sulphide layers precipitated in the presence of alkali, provided that this result is not cancelled by the absorption of alkali in the lead sulphide.

The support may be coated partly only with a layer of the said elements or in part with a monovalent or bivalent element and in part with an element of higher valency. This ensures that part of the lead sulphide exhibits conductivity properties which are different from those in another part. More particularly, in this manner lead sulphide layers can be produced having portions of opposite conductivity types and a sharp p-n transition.

As will be seen from the preceding, the invention offers interesting possibilities in the production of semi-conductive devices, more particularly of photo-resistances and photo-electric cells. The precipitation of the lead sulphide layers in the examples described hereinafter can be carried out according to two different methods viz.:

(1) 6 ccs. of a solution of 20 gms. of thio-urea per litre, 3 ccs. of a solution of 400 gms. of lead acetate per litre and 0.7 cc. of a 50% hydrazine hydrate solution are stirred together for 5 minutes. A support is arranged in this mixture and 2 ccs. of a solution of 666 gms. of NaOH per litre is added. After about 1 minute, again 0.8 cc. of this NaOH solution is added. After about 10 minutes an even lead sulphide layer has settled at room temperature.

(2) Equal parts of solutions containing 50 gms. of thio-urea per litre, 400 gms. of lead acetate per litre and 50% hydrazine hydrate, respectively, are mixed at room temperature. A support is arranged in the mixture, which is stirred and subsequently is heated to 100° C. After a period of from 5 to 10 minutes an even lead sulphide layer is deposited on the support.

The concentrations of the solutions used in carrying out the above-mentioned methods may be varied within wide limits.

*Example I*

As a support use is made of a glass plate one half of the surface of which has been provided previously, for example by deposition from vapour, with a layer consisting of Al, Sb, In or Ga. Using the first of the two methods described hereinbefore, a lead-sulphide layer is precipitated on the support, the metal layers previously provided being dissolved. The lead-sulphide deposited on the metal has n-type conductivity and the lead-sulphide deposited on the glass has p-type conductivity. On both sides of the boundary provision is made of contacts, which are spaced away from each other by a distance of 5 mms. and extend throughout the entire width of the carrier, with the use of a graphite suspension. The width of the lead-sulphide layer between the contacts is 30 mms.

The following measurements have been taken on the device produced:

(1) $l$=resistance between the contacts, measured in the dark.

(2) $$\frac{\Delta i}{i}=i_1-i_d$$

where $i_1$ represents the photocurrent on irradiation and $i_d$ the current measured in the dark. The said currents are measured at room temperature, with a potential of 6 v.

(3) $E$=photo-E.M.F. Both the E and the $i_1$ are measured while the device is exposed to radiation having an intensity of 0.1 w./sq. cm. (=$10^{18}$ quanta/sec./sq. cm.).

In the newly produced layer $l=5.10^5$ ohms, $$\frac{\Delta i}{i}=3$$

and $E$=80 mv.

After heating for 20 hours at 100° C. in air, $l=10^6$ ohms, $$\frac{\Delta i}{i}=3 \text{ to } 4$$

and $E$=40 mv.

*Example II*

If a lead-sulphide layer is deposited with the use of the second of the two methods described hereinbefore, while otherwise proceeding in the manner described in Example I, the following result is obtained:

In the newly produced layer, $l=5.10^5$ ohm, $$\frac{\Delta i}{i}=10$$

and $E$=70 mv. After heating in air for 20 hours at 100° C., $l=10^6$ ohms, $$\frac{\Delta i}{i}=20$$

and $E$=140 mv.

*Example III*

About one half of a glass plate is coated with Ag and the remainder with Sb. Between the two metal layers a strip of about 1 mm. is kept clear.

With the use of the first method a lead-sulphide layer is deposited. Furthermore the same process is used as described in Example I. In the newly produced layer, $l=10^6$ ohms, $$\frac{\Delta i}{i}=4$$

and $E$=50 mv.

When the lead-sulphide is precipitated with the use of the second method, $l=5.10^5$ ohms, $$\frac{\Delta i}{i}=3$$

and $E$= 85 mv.

*Example IV*

If one half of a glass plate is coated with Ag and the other half with In, while proceeding otherwise entirely as is described in Example III, of the newly produced layer obtained by the first method, $l=3.10^5$ ohms, $$\frac{\Delta i}{i}=3$$

and $E$=30 mv., and of the layer produced by the second method, $l=7.10^5$ ohms, $$\frac{\Delta i}{i}=3$$

and $E$=115 mv.

In the preceding examples a strip about 1 mm. wide between the contacts is photo-sensitive. If a wider photosensitive surface is required, this may be obtained with a structure a sectional view of which is shown diagrammatically in the accompanying drawing and is described in the following example.

*Example V*

Figure 2:
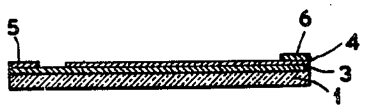

In Fig. 1, reference numeral 1 designates a support provided with an indium layer 2. On this layer a lead-sulphide layer 3 is deposited by the second of the two methods described hereinbefore, the indium layer being dissolved, as is shown in Fig. 2. The lead-sulphide layer 3, which exhibits n-type conductivity, is partly coated with a lead-sulphide layer 4 which, as usual, exhibits p-type conductivity. Finally, the two layers 3 and 4 are provided, by means of a graphite suspension, with contacts 5 and 6 respectively. In this arrangement, the lead-sulphide is photosensitive throughout the whole width between the contacts.

When the lead-sulphide layers 4 and 3 are deposited by the first and second of the two above-mentioned methods respectively, $l=5.10^4$ ohms, $$\frac{\Delta i}{i}=2$$

and $E$=90 mv. After heating for 20 hours at 100° C., $l=4.10^5$ ohms, $$\frac{\Delta i}{i}=5$$

and $E$=40 mv.

When the lead-sulphide layers 3 and 4 are both produced by the second method of deposition, $l=3.10^5$ ohms, $$\frac{\Delta i}{i}=3$$

$E$=79 mv. and, after heating for 20 hours at 100° C., $l=10^5$ ohms, $$\frac{\Delta i}{i}=2$$

and $E$=10 mv.

In the manner described hereinbefore, lead-sulphide layers of different conductivity and/or different conductivity types and, if required, a number of successive superposed layers may be combined.

What is claimed is:

1. A lead sulphide semi-conductive body having n-type conductivity comprising a support having a surface portion containing any one of the electropositive elements aluminum, gallium, indium, arsenic, antimony, bismuth, titanium, vanadium, molybdenum, and tungsten whose valency exceeds 2, and on said surface portion a layer of lead sulphide produced by precipitation from a solution.

2. A lead sulphide semi-conductive body comprising a support having a surface portion containing an electropositive element whose valency exceeds 2, and an adjacent portion free of said element, and a lead sulphide layer on said surface and adjacent portions and produced by precipitation from a solution, said lead sulphide layer portion on said element-covered surface portion possessing n-type conductivity, said lead sulphide layer portion on said adjacent surface portion possessing p-type conductivity.

3. A body as set forth in claim 2 wherein said adjacent portion contains an electropositive element whose valency is below +3.

4. A lead sulphide semi-conductive body comprising a support having a surface portion containing an electropositive element whose valency exceeds 2, a first lead sulphide layer on said surface portion and produced by precipitation from a solution, and a second lead sulphide layer on said first layer, said first and second lead sulphide layers being of opposite type conductivity thus establishing a p-n junction between the layers.

5. A method of producing an n-type lead sulphide semi-conductive body, which comprises slowly precipitating onto a support having a layer containing an electropositive element whose valency exceeds 2, a lead sulphide layer from a solution of lead acetate in the presence of thiourea and a substance selected from the group consisting of alkali hydroxide and hydrazine at which the precipitating lead sulphide layer dissolves all of the element layer and thus absorbs all of the element's atoms, and thereafter applying spaced contacts to the lead sulphide layer.

6. A method of producing a lead sulphide semi-conductive body, which comprises slowly precipitating onto a support having a layer containing an electropositive element whose valency exceeds 2, a first lead sulphide layer from a solution of lead acetate in the presence of thiourea and a substance selected from the group consisting of alkali hydroxide and hydrazine at which the precipitating lead sulphide layer dissolves part of the element layer and thus absorbs some of the element's atoms, and thereafter precipitating by the same process a second layer of lead sulphide on the first formed layer of lead sulphide whereby the first and second layers exhibit opposite type conductivities.

7. A method of producing a lead sulphide semi-conductive body, which comprises slowly precipitating onto a support having a layer containing an electropositive element selected from the group consisting of aluminum, gallium, arsenic, bismuth, titanium, vanadium, molybdenum, and tungsten, a lead sulphide layer from a solution of lead acetate in the presence of thiourea and a substance selected from the group consisting of alkali hydroxide and hydrazine at which the precipitating lead sulphide layer dissolves part of the element layer and thus absorbs some of the element's atoms.

References Cited in the file of this patent

UNITED STATES PATENTS

| | | |
|---|---|---|
| 1,919,988 | Rupp | July 25, 1933 |
| 1,998,334 | Rupp | Apr. 16, 1935 |
| 2,809,132 | Bloem | Oct. 8, 1957 |